Figure 1:
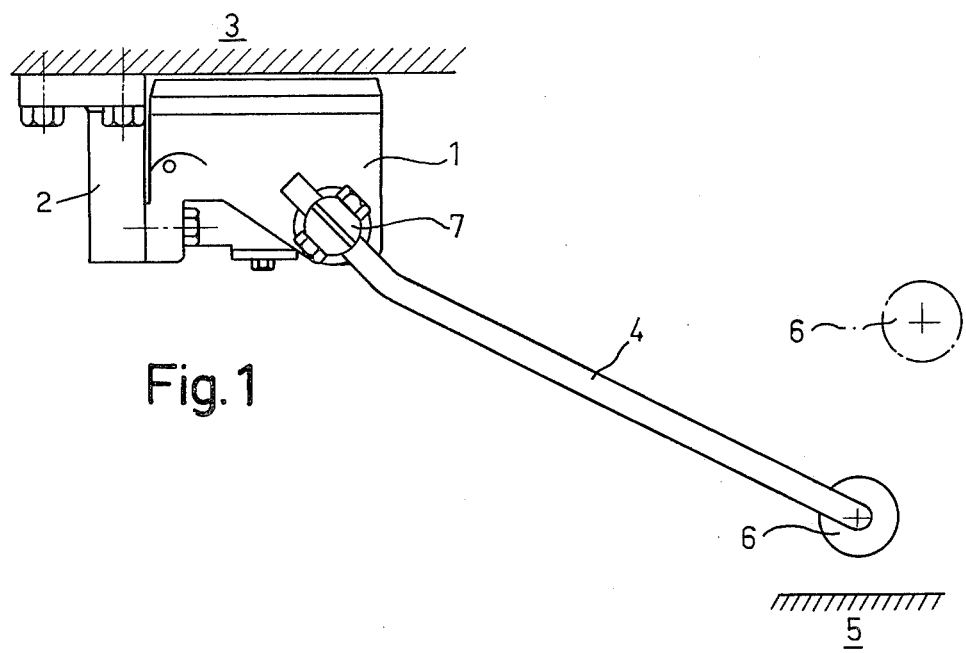

United States Patent [19]

Severinsson et al.

[11] 4,321,985
[45] Mar. 30, 1982

[54] CHANGE-OVER VALVE, PREFERABLY FOR A RAILWAY VEHICLE

[75] Inventors: Lars M. Severinsson, Hishult; Ragnar Segersten, Malmo, both of Sweden

[73] Assignee: SAB Industri AB, Landskrona, Sweden

[21] Appl. No.: 144,944

[22] PCT Filed: Aug. 25, 1978

[86] PCT No.: PCT/SE78/00035
§ 371 Date: Apr. 26, 1979
§ 102(e) Date: Apr. 26, 1979

[87] PCT Pub. No.: WO79/00123
PCT Pub. Date: Mar. 22, 1979

[30] Foreign Application Priority Data
Sep. 1, 1977 [SE] Sweden ............... 7709828

[51] Int. Cl.³ .................................. B60T 8/20
[52] U.S. Cl. ........................... 188/195; 303/23 R
[58] Field of Search ........... 188/195; 303/22 A, 22 R, 303/23 A, 23 R

[56] References Cited
U.S. PATENT DOCUMENTS
4,235,478 11/1980 Billeter .................... 188/195 X FOREIGN PATENT DOCUMENTS
1080757 8/1967 United Kingdom .

Primary Examiner—Duane A. Reger
Attorney, Agent, or Firm—Laurence R. Brown

[57] ABSTRACT

This invention relates to a change-over valve (or a so called empty-load valve), preferably for a railway vehicle, having a valve device opening or closing a pneumatic passageway depending on the position of a mechanical operating system or in other words the load on the vehicle.

In order to improve the working range of the external operating arm and the exactness of the change-over point the operating system comprises a force transmitting chain from said operating arm to the valve device via a spring, a knee lever, and a valve operating rod structured in such a geometrical way that the axis of the spring is substantially perpendicular to the valve operating rod.

8 Claims, 4 Drawing Figures

CHANGE-OVER VALVE, PREFERABLY FOR A RAILWAY VEHICLE

This invention relates to a change-over valve, preferably for a railway vehicle, comprising a valve device for emitting one of two different pneumatic pressures at a constant inlet pressure depending on the position of a mechanical operating system operated at increasing load on the vehicle.

Many such change-over valves are earlier known. Good examples of the prior art are U.S. Pat. Nos. 3,291,265 and 4,010,771.

In the former case the operating system for the valve device comprises an axially movable operating rod, which is arranged axially in series with the valve device. This means that great forces can be transmitted to the valve device from the vehicle underframe via the push rod, which forces can be detrimental to the valve device. It is also difficult to mount this type of change-over valve protected against external influences of for example dirt, water, ice, and heat.

The axial movements of the push rod in this change-over valve also give rise to severe sealing and wear problems. It is thus advantageous to replace this axial movement by a rotational movement relative to the change-over valve itself. Such an alteration, which is known for example through the second patent mentioned above, makes it also possible to mount the change-over valve more protected from external influences.

A common drawback with both the known change-over valves is that only comparatively small movements of the axially movable operating rod or the rotatable operating arm respectively are possible. Another drawback is a less than satisfactory exactness as regards the change-over point for the valve.

The main object of the invention is to obviate these and other drawbacks and to accomplish a small-size, inexpensive and reliable device only requiring maintenance after long service periods.

This is according to the invention attained in that the operating system comprises as a force transmitting chain an external operating arm on a shaft rotatably arranged in a valve housing, an operating compression spring, which is arranged substantially perpendicular to said shaft between a bridge thereon and a first arm of a knee lever, which is pivotally movable around its knee and which with its second arm is arranged to act on a valve operating rod, which is substantially parallel to said first knee lever arm and the bridge.

In order to make adjustment of the play between the bridge and the operating rod possible the operating spring is guided by a spring rod, which extends through the bridge and the effective length of which may be adjusted.

It is preferred only to allow movements depending on a change of the load on the vehicle to reach the valve device. Other short-term movements may be transmitted to the operating arm under operational conditions due to the normal springing of the vehicle or rocking of the vehicle in certain cases. According to the invention the valve operating rod is provided with a damper preventing fast rod movements.

In the practical embodiment the valve operating rod is provided with a diaphragm type piston, which is movable in a sealed damper housing and has a restricted through opening for allowing the air confined in the housing to slowly pass from one side of the piston to the other. The opening is defined between a hole in the piston and a pin loose in the housing.

It is important to note that the dampening effect solely comes from air. In this way a simple but yet highly effective design is attained.

In the practical embodiment there is a rod return spring of compression type between a valve operating rod flange and the valve housing biasing the rod towards its rest position with the piston against a damper housing wall.

There is also a bridge return spring between the housing and the bridge biasing the bridge towards a rest position against abutments in the valve housing.

The dimensioning of the different parts of the operating system is such that the total ratio between a roller at the end of the operating arm and the valve operating rod is in the order of 2:1.

Figure 2:
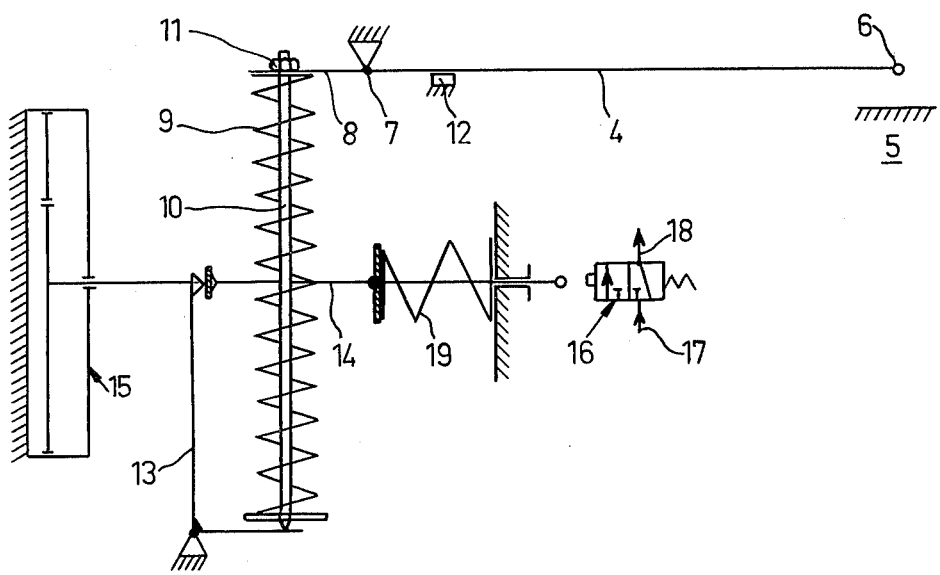
Figure 3:
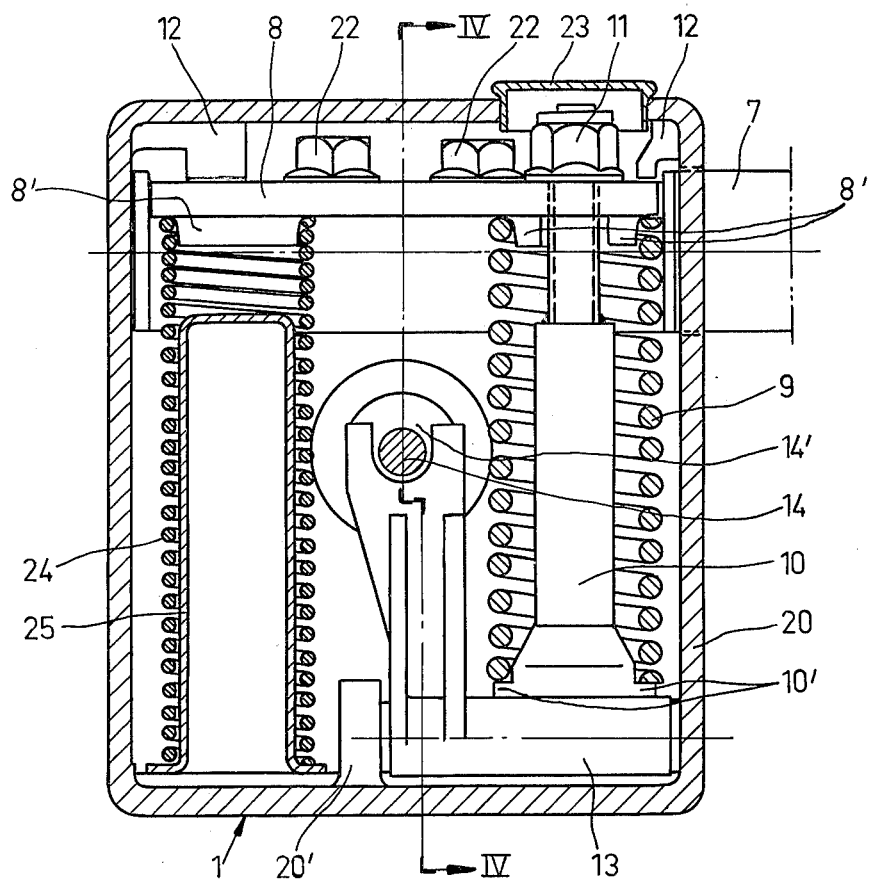
Figure 4:
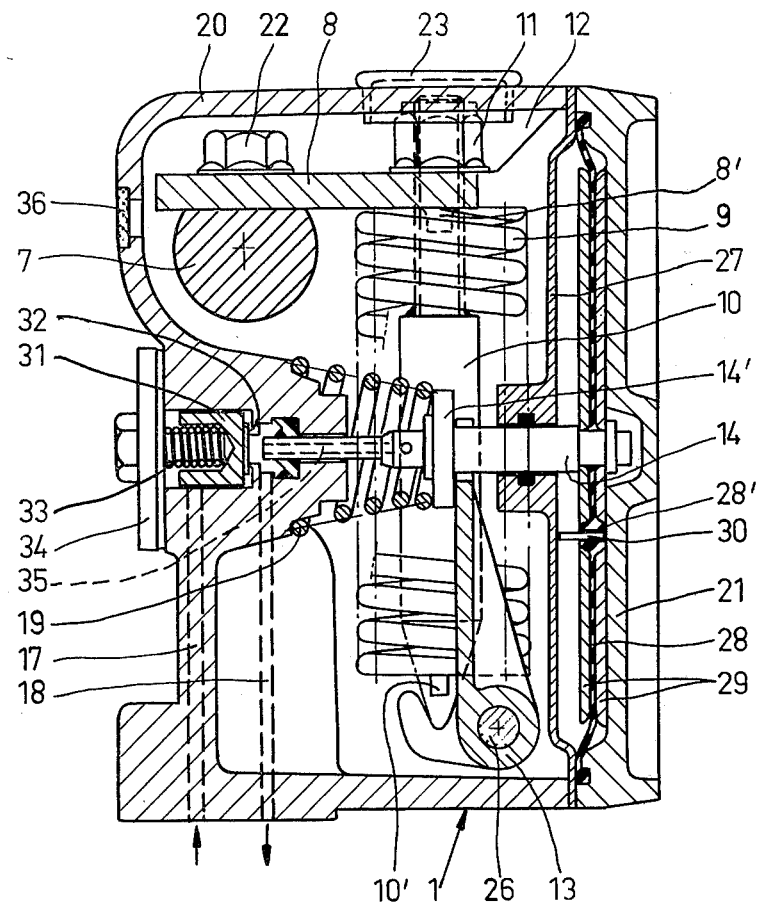

The invention will be described in further detail below reference being made to the accompanying drawings, in which FIG. 1 is a side view shows a change-over valve according to the invention, FIG. 2 is a schematic representation of the working principle of the valve, FIG. 3 is a view of the valve with its cover removed but also with some parts sectioned for better clarity, and FIG. 4 is a section substantially along the line IV—IV in FIG. 3.

A change-over valve 1 is attached to a mounting console 2, which in turn is attached to a rail vehicle body 3. An operating arm 4 is rotatably connected to the change-over valve 1 and extends towards a side-frame 5 of the vehicle bogie. The arm 4 is provided with a roller 6 for cooperation with the side-frame 5. In the shown rest position with the vehicle empty there is a certain distance, say 20 mm, between the side-frame 5 and the roller 6 for preventing small movements of the side-frame from affecting the change-over valve. When the vehicle is loaded the distance between the vehicle body 3 and the side-frame 5 will decrease, which means that the arm 4 will rotate in counter-clockwise direction after travel in excess of the shown distance between the side-frame 5 and the roller 6. A maximum movement of the arm 4 and its roller 6 to the phantom position of 100 mm (in the vertical direction) should be possible. In the shown case the vertical distance in the rest position between the parts 3 and 5 is 260 mm.

As appears from FIG. 1 the effective length of the arm 4 may be adjusted due to its releasable connection to its shaft 7.

In the schematic representation of the valve 1 in FIG. 2 the parts 4–7 may be recognized from FIG. 1. The other parts now to be mentioned under reference to FIG. 2 are further described below under reference to FIGS. 3 and 4.

The operating arm 4 is part of a double-armed lever, whose other arm is a bridge 8 acting downwards in FIG. 2 on a prestressed helical compression spring 9, called an operating spring. The spring 9 is arranged around a spring rod 10, whose effective length may be adjusted by means of an adjustment nut 11 and whose lower end provides a support for the spring 9. There is an abutment 12 defining the angular rest position for the operating arm 4 and the bridge 8.

The force from the spring 9 acts on the horizontal arm of a knee lever 13, whose vertical arm acts on a valve operating rod 14, substantially perpendicular to the spring rod 10. It is obvious that this valve operating rod 14 will move to the right in the drawing at a counter-clockwise turning of the operating arm 4 under the influence of a movement upwards of the bogie side-frame 5.

The valve operating rod 14 is at its left hand end provided with a damper 15 to be described more detailed below under reference to FIGS. 3 and 4. At its right hand end the valve operating rod 14 is arranged to cooperate with a three-way valve 16 spring-biased to its shown rest position, in which fluid supplied through an inlet 17 will be prevented from reaching an outlet 18, which in turn is vented to the atmosphere. In its operated position (not shown) the valve 16 will allow passage of fluid from the inlet 17 to the outlet 18. This means that in the shown rest position of the change-over valve 1, corresponding to an empty vehicle, atmospheric pressure will prevail in the outlet 18, whereas in the outlet 18 the same fluid pressure will prevail as in the inlet 17, when the vehicle is loaded to a certain extent or in other words when the operating arm 4 is turned in its counter-clockwise direction a certain angle.

A return spring 19 is provided for the valve operating rod 14.

Referring now specifically to FIGS. 3 and 4 for a more detailed description of the change-over valve 1, it has a housing 20 with a cover 21 attached thereto.

The operating arm shaft 7 is properly journalled in the housing and extends out of the housing 20 with its right hand end as shown in FIG. 3. The bridge 8 is attached to the shaft 7 by means of bolts 22. The abutments 12 for defining the angular rest position for the shaft 7 are formed as integral parts of the housing 20.

The spring rod 10 is provided with spring supports 10' and is tapered downwards for cooperation with a corresponding notch in the knee cover 13, as appears from FIG. 4. At its opposite end the spring rod 10 is threaded for receiving the adjustment nut 11, which after removal of a cap 23 is accessible from outside for adjusting the effective length of the spring rod 10.

Between the bridge 8 and the housing 20 is also arranged a return spring 24 of the helical compression type with its centre line in the same plane as that of the operating spring 9, i.e. the plane of FIG. 3. The return spring 24 is guided and supported by a spring support 25, and there are projections 8' on the bridge 8 for ensuring the proper position for both springs 9 and 24 relative to the bridge 8. The return spring 24 will bias the bridge 8 towards the abutments 12 and thus the operating arm 4 towards its rest position as shown in FIG. 1.

The knee lever 13 is rotatably journalled on a shaft 26 (FIG. 4) mounted in the housing 20 and a housing bracket 20'. The fork-shaped upper end of the knee lever 13 is placed astraddle of the valve operating rod 14 and cooperates with a flange 14' thereon. The rod return spring 19 of compression type is arranged between the housing 20 and the rod flange 14'.

The valve operating rod 14 is, as appears from FIG. 4, axially movably supported near its left end by the housing 20 and near its right end by a damper cover 27, and there are ordinary sealings in both instances.

The damper 15 for the valve operating rod 14 referred to briefly above under reference to FIG. 2 is of the following design:

A damper housing comprises the valve housing cover 21 and the damper cover 27, which is clamped between the former cover and the housing 20 together with a damper diaphragm 28. This diaphragm 28 is supported by backing plates 29 and is together with these attached to the valve operating rod 14.

In the diaphragm 28 there is a circular hole with a metal bushing 28' for a pin 30, which is not attached to either of the covers 21 or 27 in order not to bind in any way. The diameter of the hole in the bushing 28' may be 0,05 mm larger than that of the pin 30, having a diameter of 1,5 mm. This means that the enclosed air in the damper will have to be forced through the narrow opening around the pin 30 at the movements of the valve operating rod 14, which thus will be damped.

The opposite end (the left hand end in FIG. 4) is arranged to cooperate with a valve body 31, which is sealingly biased against a valve seat 32 in the housing 20 by means of a valve spring 33 supported by a cover 34 attached to the housing 20. An inlet channel 17 extends to the compartment around the valve body 31, whereas an outlet channel 18 extends from the compartment around the end of the valve operating rod 14. This rod 14 is provided with an axial bore 35, which connects the latter compartment with the interior of the housing 20 and, via a filter 36 in the housing wall, with the atmosphere.

In the rest position shown in all Figures with the vehicle substantially empty and thus with the operating arm roller 6 substantially unaffected by the bogie side-frame 5 the valve body 31 will be sealingly held against its seat 32. This means that a fluid pressure transmitted through the inlet channel 17 will not reach the outlet channel 18, which instead will be under atmospheric pressure through the axial bore 35 in the valve operating rod 14 and the filter 36. If now, still with the vehicle substantially empty, the operating arm 4 will be moved up and down in an oscillating way due to rocking movements between the vehicle body 3 and the bogie side-frame 5 under operational conditions, substantially no movement of the valve operating rod 14 will occur due to the dampening effect of the air trying to pass the narrow opening between the pin 30 and the hole in the bushing 28'.

When the vehicle is loaded to a certain extent, so that there is a permanent counter-clockwise turning of the shaft 7 due to the diminished vertical distance between the vehicle body 3 and the bogie side-frame 5, this movement wil be transmitted to the valve operating rod 14 via the bridge 8, the operating spring 9, the knee lever 13 and the rod flange 14' in a rate determined by the air damper 15. The operating rod 14 will lift the valve body 31 from its seat 32 at the same time as the hole 35 will be closed. In this way the outlet channel 18 will be communicated with the inlet channel 17 instead of with the atmosphere, and the same pressure will prevail in the outlet channel 18 as in the inlet channel 17.

Again under operational conditions rocking movements may occur between the vehicle body 3 and the bogie side-frame 5. These movements will however not be transmitted to the valve operating rod 14 due to the dampening effect of the damper 15.

The inlet channel 17 is connected to a source for fluid (air) under a constant pressure, whereas the outlet channel 18 is connected to any suitable means (not further described here) for effecting a more powerful braking of the loaded vehicle than of the empty one, i.e. when the pressure in the inlet channel 17 prevails in the outlet channel 18 and not the atmospheric pressure.

The dimensioning of the different parts in the practical embodiment is such that the total movement ratio between the arm roller 6 and the valve operating rod 14 is in the order of 2:1, which means that a vertical movement of the roller 6 in the order of 20 mm would correspond to an axial movement of the rod 14 in the order of 10 mm.

It is, however, to be noted that the possible axial movement of the valve operating rod 14 is limited to about 5,5 mm in the practical embodiment, corresponding to a movement of about 11 mm for the roller 6. Vertical movements upwards of the roller 6 exceeding this measure will only result in a compression of the operating spring 9. The change-over point for the valve will be reached after an axial movement of the rod 14 in the order of 3,5 mm.

The function of the adjustment nut 11 is to allow adjustment (preferably at the manufacturing) of the play between the knee lever 13 and the operating rod flange 14', so that the sum of all tolerances in the activating chain from the bridge 8 to the valve body 31 does not effect the position of the change-over point.

The damper 15 is designed to delay the movement of the valve operating rod 14 at least three seconds, which is enough, as the minimum frequency of the rocking movement between the vehicle body 3 and the bogie side-frame 5 is between 0,5 and 1 cps.

The maximum possible vertical movement of the operating arm roller 6, which as earlier stated shall be in the order of 100 mm, is determined by the distance between the bridge 8 (or rather its projection 8') and the spring support 25.

We claim:

1. A change-over valve for railway vehicles, and the like processing a constant fluid under pressure available at inlet means and emitting fluid at one of two different fluid pressures at outlet means in response to the load of the vehicle, comprising in combination, a mechanical system on the vehicle operative with changes of vehicle load including an operating lever arm, a valve housing, a shaft rotatively mounted in said valve housing and coupled for rotation by movement of said operating lever arm, an operating longitudinally oriented compression spring having two ends arranged substantially perpendicular to said shaft, a retaining member confining one end of said spring, a knee lever pivotable about a knee and having thereon movable therewith a first lever arm engaging the other end of said spring and a second lever arm, a valve with said inlet and outlet means, a valve operating rod positioned substantially perpendicular to said spring to operate said valve to produce said two different pressures and coupled for this purpose for movement by the second lever arm said knee lever.

2. A change-over valve as defined in claim 1 wherein a guide rod extends through the spring, and including means for adjusting said retaining member to change the distance between said one end of the spring and the first knee lever arm.

3. A change-over valve as defined in claim 1 including damper means limiting fast changes of movement of the valve operating rod.

4. A change-over valve as defined in claim 3 wherein the damper means comprises a diaphragm type piston movable in a sealed damper housing having therein a restricted opening for passage of air from one side of the piston to the other.

5. A change-over valve as defined in claim 4 wherein the restricted opening is defined by an aperture through the piston containing a loosely fitting pin therethrough.

6. A change-over valve as defined in claim 3 wherein the rod has a return spring biasing it towards a rest position with the piston engaging a wall in the damper housing.

7. A change-over valve as defined in claim 1 wherein said retaining member is movable along the axis of the compressing spring, including a return spring biasing said retaining member towards a rest position urging the retaining member in a direction away from the spring end.

8. A change-over valve as defined in claim 1 wherein the operating lever arm has an actuating roller at the end opposite said rotatively mounted shaft, and the operating lever has a length related to the mechanism causing the valve operating rod to move in the order of half the distance of movement of the lever arm at said roller.

* * * * *